(12) United States Patent
Sakai (10) Patent No.: US 6,556,907 B1
(45) Date of Patent: Apr. 29, 2003

(54) VEHICLE SUSPENSION SYSTEM

(75) Inventor: Kouji Sakai, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/709,969

(22) Filed: Nov. 10, 2000

(30) Foreign Application Priority Data

Nov. 11, 1999 (JP) .......................................... 11-320864
Jan. 12, 2000 (JP) .......................................... 12-003385

(51) Int. Cl.$^7$ .............................. B60G 11/00; B60G 7/00
(52) U.S. Cl. ....................... 701/37; 280/5.5; 280/124.1
(58) Field of Search ...................... 701/37, 36; 280/5.5, 280/124.1, 124.104

(56) References Cited

U.S. PATENT DOCUMENTS

| | | | |
|---|---|---|---|
| 4,295,660 A | 10/1981 | Toti et al. | |
| 5,269,556 A | 12/1993 | Heyring | |
| 5,294,146 A | 3/1994 | Tabata et al. | |
| 5,340,146 A | 8/1994 | Kato | |
| 5,480,188 A | 1/1996 | Heyring | |
| 5,486,018 A | 1/1996 | Sakai | |
| 5,556,115 A | 9/1996 | Heyring | |
| 5,915,701 A | 6/1999 | Heyring | |
| 6,010,139 A | 1/2000 | Heyring et al. | |
| 6,102,170 A | 8/2000 | de Molina et al. | |
| 6,250,658 B1 | 6/2001 | Sakai | |

FOREIGN PATENT DOCUMENTS

| | | |
|---|---|---|
| DE | 3426734 | 8/1995 |
| DE | 9415009 | 1/1996 |
| EP | 0855296 A2 | 7/1998 |
| JP | 05213040 | 8/1993 |
| JP | 06072127 | 3/1994 |
| JP | 09193641 | 7/1997 |
| JP | 09193642 | 7/1997 |
| JP | 10110763 | 4/1998 |
| JP | 11334338 | 12/1999 |
| JP | 2000062430 | 2/2000 |

*Primary Examiner*—William A. Cuchlinski, Jr.
*Assistant Examiner*—Olga Hernandez
(74) *Attorney, Agent, or Firm*—Knobbe, Martens, Olson & Bear, LLP (57) ABSTRACT

A vehicle suspension system comprises at least a pair of interrelated damper units. The units communicate with one another through a pressure regulating unit. The pressure regulating unit comprises a pair of chambers that are connected with a bypass passage. Two throttle valves are disposed along the bypass passage. The sizing of various components are calculated based on a number of relationships set forth in equalities that match damping whether under acceleration type forces or deceleration forces.

20 Claims, 5 Drawing Sheets

Figure 5

VEHICLE SUSPENSION SYSTEM

PRIORITY INFORMATION

This application is based on and claims priority to Japanese Patent Application numbers 11-320864, filed Nov. 11, 1999, and 2000-3385, filed Jan. 12, 2000.

BACKGROUND OF THE INVENTION

1. Field of the Invention

The present invention generally relates to a vehicle suspension system for use in four-wheeled vehicles having two or more interrelated damper units. More particularly, the present invention to the sizing and configuration of certain components within such a vehicle suspension system so as to provide improved interrelationships between the components for controlling vehicle movement.

2. Description of the Related Art

Vehicle suspension systems have been proposed that embody individual hydraulic dampers associated with each of the wheels for damping their respective motion. As a further improvement upon this arrangement, systems have been proposed wherein pairs or more of wheels may be interrelated to control the roll and/or pitch of a vehicle in addition to individual wheel damping when encountering objects. For instance, during rapid deceleration or emergency braking, the suspension system allows interaction between the front and rear suspended members. Moreover, during cornering, the vehicle suspension system allows interrelation between the suspended members to increase traction and control. Various systems have been proposed for accomplishing these effects, many of which have become quite complicated in nature and in construction. Often involving electronic sensors and complicated control strategies.

One particular advantageous type of system and numerous embodiments of it is disclosed in U.S. Pat. No. 5,486, 018, issued Jan. 23, 1996. In this type of system, each wheel is associated with a hydraulic damper that is comprised of a cylinder in which a piston reciprocates. The cylinder is connected to either the wheel or the vehicle body and the piston is connected by a piston rod to the remaining vehicle component. The piston divides the cylinder into a pair of fluid chambers one of which may be considered to be a working chamber and the other of which may be considered to be a reservoir chamber. A damp valve arrangement is provided for controlling the flow between the working cylinder portion and the reservoir chamber thus, the individual units act like conventional shock absorbers.

However, the piston rod displaces a volume in one of the chambers and thus, it is necessary to provide a reservoir where the displaced fluid may be added and subtracted to compensate for the piston rod displacement amount. In accordance with the embodiments disclosed in that patent, pairs of wheels have a common reservoir arrangement which acts as a pressure control system. The makeup fluid from each unit is transferred to a respective variable volume chamber and the movable elements of those two chambers are interlinked to each other so as to provide additional suspension control between the two associated wheels for controlling vehicle body movement. This can be utilized to reduce roll and/or pitching.

For example, if the associated or interconnected wheels are at opposite sides of the vehicle when both wheels strike an obstacle, each piston and cylinder of the shock absorbing unit will undergo the same movement in the same direction. The differential fluids are transferred between the pressure control device and will cause equal displacements of the movable members that are interrelated and the system operates as a conventional suspension system. If, however, the vehicle is maneuvered around a curved path of travel, one suspension unit (i.e., the one on the outside) will tend to be compressed while that on the inside will tend to expand. Thus, there is a differential flow of fluid between the units and the interconnection provides further damping control resistance of such body motion.

The difficulty with this type of system is that the requirements in terms of size and capacity of the individual shock absorbers differ for optimum damping depending upon whether the displacement occurs during normal straight-ahead movement or when rounding a curve. Similar situations are true with respect to front and rear interconnected suspensions for damping pitching movements during acceleration or braking. That is, when the pressure control device is acting to damping body movements between the two wheels, the pressure control device works in combination with the respective shock absorbers because of this the individual wheel shock absorbers should be somewhat smaller to reduce the effect on the overall body control. Thus, the individual shock absorber design tends to be a compromise between the optimum for these two different damping conditions.

Figure 1:
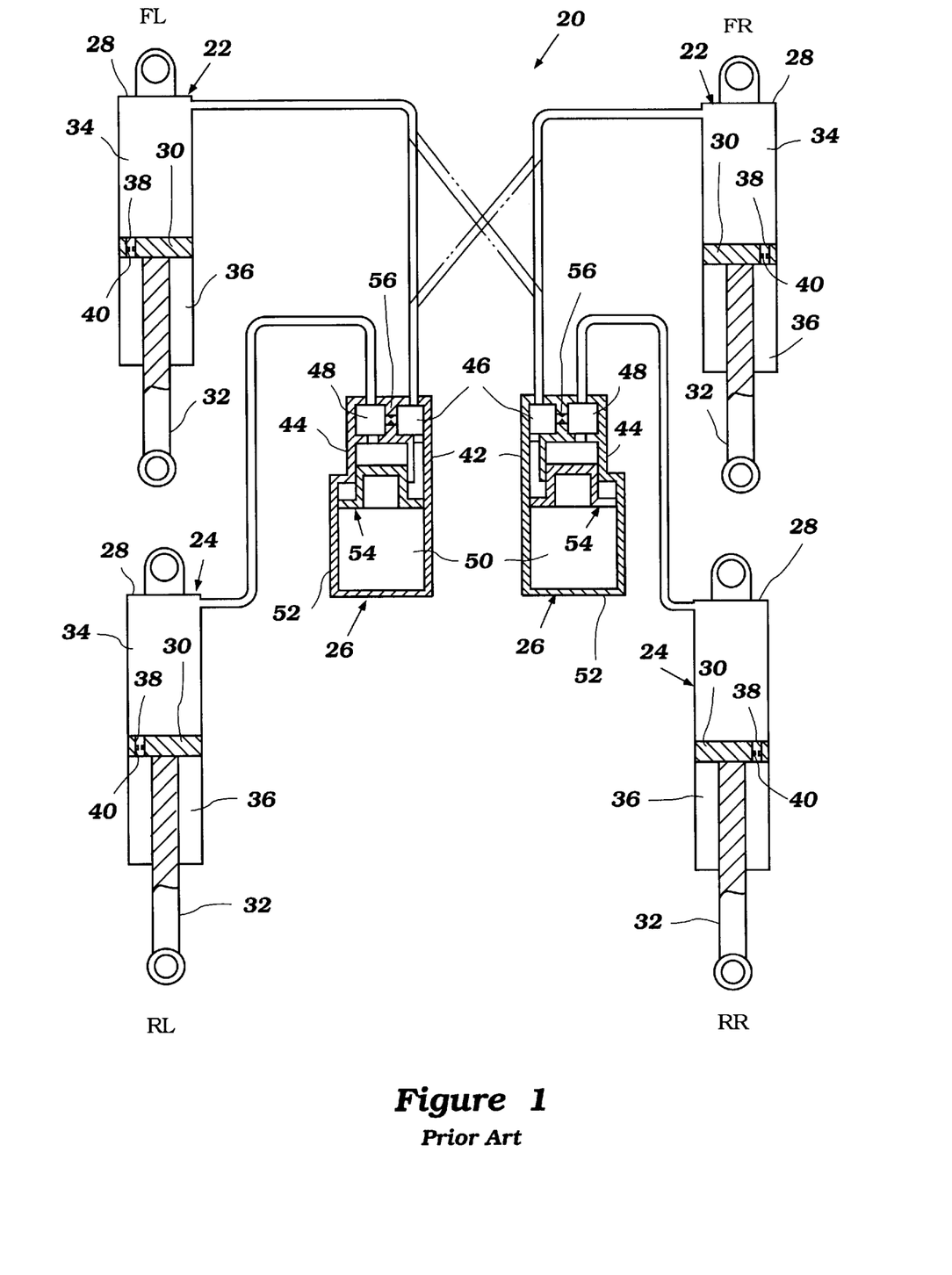
FIG. 1, described above, is a schematic illustration of a previous suspension system construction.

With reference now to FIG. 1, a vehicle suspension system of the interrelated type is disclosed therein. The suspension system indicated generally by the reference numeral comprises two mirrored halves in the illustrated arrangement each halve comprises a first damper 22 and a second damper 24. In the illustrated arrangement, the first damper 22 and the second damper 24 are connected through a pressure regulator 26. As indicated by the phantom lines in FIG. 1, a single pressure regulator 26 can be interconnected to the first damper 22 (i.e., a front damper) and a second damper (i.e., a rear damper). In some arrangements, a cross-relationship may arise such that a front left damper is connected to a rear right damper and a front right damper is connected to a rear left damper. Such a construction is illustrated with phantom lines in FIG. 1. In other arrangements, a front left damper will be connected to a rear left damper while a front right damper will be connected to a rear right damper such as that illustrated in solid lines in FIG. 1.

In the illustrated arrangement of FIG. 1, the first damper 22 is configured of a cylinder 28 in which a piston 30 is arranged to reciprocate. A piston rod 32 connects to the piston 30 at one end and to a component of the vehicle at the other end. As is known, the damper 22 is positioned between a sprung and unsprung number of the vehicle. For instance, as is generally known in a sprung portion of the vehicle (i.e., the vehicle body) differs from the unsprung portion of the vehicle (i.e., the suspension), in that a spring is positioned between the vehicle body and the operating surface whereas the unsprung portion of the vehicle does not have a spring interposed between its and the operating surface. In the illustrated arrangement, the piston rod 32 is connected to one of the vehicle body and the wheel whereas the cylinder 28 is connected to the other of the two members. Such a construction advantageously results in an upper fluid chamber 34 and a lower fluid chamber 36 that are segregated from each other by the piston 30.

The piston 30 preferably has one or more passages 38 defined therethrough which allow communication between the upper fluid chamber 34 and the lower fluid chamber 36.

As will be appreciated, the term upper and lower are relative and used for ease of description but need not be an upper and lower chamber in all instances. A throttle valve 40 preferably is disposed along the passage 38 to control the flow of fluid between the upper fluid chamber 34 and the lower fluid chamber 36. It should be noted that a similar construction is used for each of the dampers 22, 24 in the illustrated arrangement of FIG. 1. Accordingly, the components associated with each of these dampers 22, 24 will not be further described.

The upper and lower fluid chambers 34, 36 preferably are filled with a fluid or gas such as that known to those of ordinary skill in the art. As such, the first damper 22 and the second damper 24 are in fluid communication with one another through the pressure regulator 26. The pressure regulator 26 in the arrangement illustrated in FIG. 1, comprises a first cylinder 42 and a second cylinder 44. The first cylinder and the second cylinder 42, 44, generally are formed within a single outer body. The first cylinder 42 has a first oil chamber or fluid chamber 46 which is in direct communication with the upper fluid chamber 34 of the first damper 22. Similarly, the second cylinder 44 has a second fluid chamber 48 that is in direct fluid communication with the upper fluid chamber 34 of the second damper 24.

In the arrangement illustrated in FIG. 1, a high pressure gas chamber 50 is defined in a lower portion of the body 52. A piston 54 is interposed between the high pressure gas chamber 50 and the first cylinder and second cylinder 42, 44. Moreover, a single throttle valve 56 is interposed between the first fluid chamber 46 and the second fluid chamber 48. In addition, the piston 54 is sized and configured such that the first oil chamber 46 and the second oil chamber 48 have the same effective cross-sectional areas such that the same force will be exerted from both the first cylinder 42 and the second cylinder 44 upon the piston 54.

The arrangement described above produces a damping force through the valves 40 which are disposed within the pistons 30 of both the first damper 22 and the second damper 24 when the first damper 22 and the second damper 24 work in generally the same direction with approximately the same displacement. However, when the first damper 22 and the second damper 24 operate in opposite directions or with varying amounts then damping forces are also produced through the single valve 56 that is defined between a first cylinder 42 and the second cylinder 44. Thus, when the front wheels in the illustrated arrangement and the rear wheels encounter similar conditions causing vertical displacement in the same direction of approximately the same amount, the only damping forces created are through the valves 40. However, when the front dampers and the rear dampers act in opposite directions, such as during emergency braking for instance, then an additional damping force is provided by flow which will occur through the valve 56. Accordingly, the damping forces are greater in the illustrated arrangement during panic stops and rapid accelerations as compared to vehicle turning.

As discussed above, in some arrangements, there may be a cross-configuration between the front left cylinder or damper 22 and the rear right damper 24. In such cross-interrelations, similar phenomena can be expected, however, under this construction, the damping forces will tend to be higher when the vehicle rolls or pitches than when the vehicle bounces.

Unfortunately, in the above-described suspension system, close tolerances as well as dimensions must be maintained among each of the four cylinders or dampers. In addition, close dimensional parity must be maintained between the two pressure regulators as well as the lever ratios of the suspension system. As is known to those of ordinary skill in the art, a lever ratio varies depending upon the mounting angle and location of the various suspension components. For instance, if a damper were to be mounted vertically atop of an axle, it would be said to have a one-to-one lever ratio i.e., one inch of vertical shock travel would be the same as one inch of vertical wheel travel. If, however, the shock was mounted at a 45° angle, it will move approximately one-half the amount that the wheel moves, i.e., one-half inch of vertical shock travel for one inch of vertical wheel travel. As such, it would be said to have a 1.5 to 1 lever ratio.

Due to the restrictions on the configuration and sizing of the components, arranging a suspension system for both the front and rear wheels to adapt to weight distribution changes becomes fairly difficult in addition, the restrictions placed on the design of the suspension system reduces the degrees of freedom available when designing the front and rear suspension systems.

Such difficulties can be lessened to some extent by mutually changing the configuration of both the front and the rear suspension systems. However, in order to change the configurations, the ultimate result must be designed such that the damping forces produced by the throttle valves do not differ regardless of whether the front cylinders or dampers are being compressed and the rear dampers are being extended or whether the front dampers are being extended while the rear dampers are being compressed.

SUMMARY OF THE INVENTION

Accordingly, one aspect of the present invention involves a vehicle suspension system comprising a first damper and a second damper. The first damper and the second damper are interrelated. The first damper comprises a first piston and a first cylinder body. A first cylinder bore is defined by the first cylinder body. The first piston is arranged to reciprocate within the first cylinder bore. The first piston has a first effective area $a_1$. The first damper extends between a first wheel and a vehicle body. The second damper comprises a second piston and a second cylinder body. A second cylinder bore is defined by the second cylinder body. The second piston is arranged to reciprocate within the second cylinder bore. The second piston has a second effective area $a_2$. The second damper extends between a second wheel and the vehicle body. A first chamber is defined within the first cylinder body at least in part by the first piston. A second chamber is defined within the second cylinder body at least in part by the second piston. A first pressure regulating cylinder is in fluid communication with the first chamber and a second pressure regulating cylinder is in fluid communication with the second chamber. The first pressure regulating cylinder comprises a first variable volume chamber and the second pressure regulating cylinder comprises a second variable volume chamber. The first variable volume chamber and the second variable volume chamber are defined at least in part by a single moveable member. The single moveable member has a first subarea $A_1$ that corresponds to the first variable volume chamber and a second subarea $A_2$ that corresponds to the second variable volume chamber. A bypass passage extends between the first variable volume chamber and the second variable volume chamber and a first throttle valve and a second throttle valve are positioned within the bypass passage.

Another aspect of the present invention involves a vehicle suspension system comprising a first damper and a second damper. The first damper and the second damper are interrelated. The first damper comprises a first piston and a first cylinder body. A first cylinder bore is defined by the first cylinder body. The first piston is arranged to reciprocate within the first cylinder bore. The first damper extends between a first wheel and a vehicle body. The second damper comprises a second piston and a second cylinder body. A second cylinder bore is defined by the second cylinder body. The second piston is arranged to reciprocate within the second cylinder bore. The second damper extends between a second wheel and the vehicle body. A first chamber is defined within the first cylinder body at least in part by the first piston. A second chamber is defined within the second cylinder body at least in part by the second piston. A first pressure regulating cylinder is in fluid communication with the first chamber and a second pressure regulating cylinder is in fluid communication with the second chamber. The first pressure regulating cylinder comprises a first variable volume chamber and the second pressure regulating cylinder comprises a second variable volume chamber. The first variable volume chamber and the second variable volume chamber are defined at least in part by a single moveable member. A bypass passage extends between the first variable volume chamber and the second variable volume chamber and a first throttle valve and a second throttle valve are positioned within the bypass passage. Means for substantially stopping flow through the bypass passage when the first wheel and the second wheel move relative to the vehicle body also are provided.

BRIEF DESCRIPTION OF THE DRAWINGS

These and other features, aspects and advantages of the present invention will now be described with reference to the drawings of preferred embodiments, which are intended to illustrate and not to limit the present invention. The drawings comprise five figures of which one has already been described.

DETAILED DESCRIPTION OF THE PREFERRED EMBODIMENTS

Figure 2:
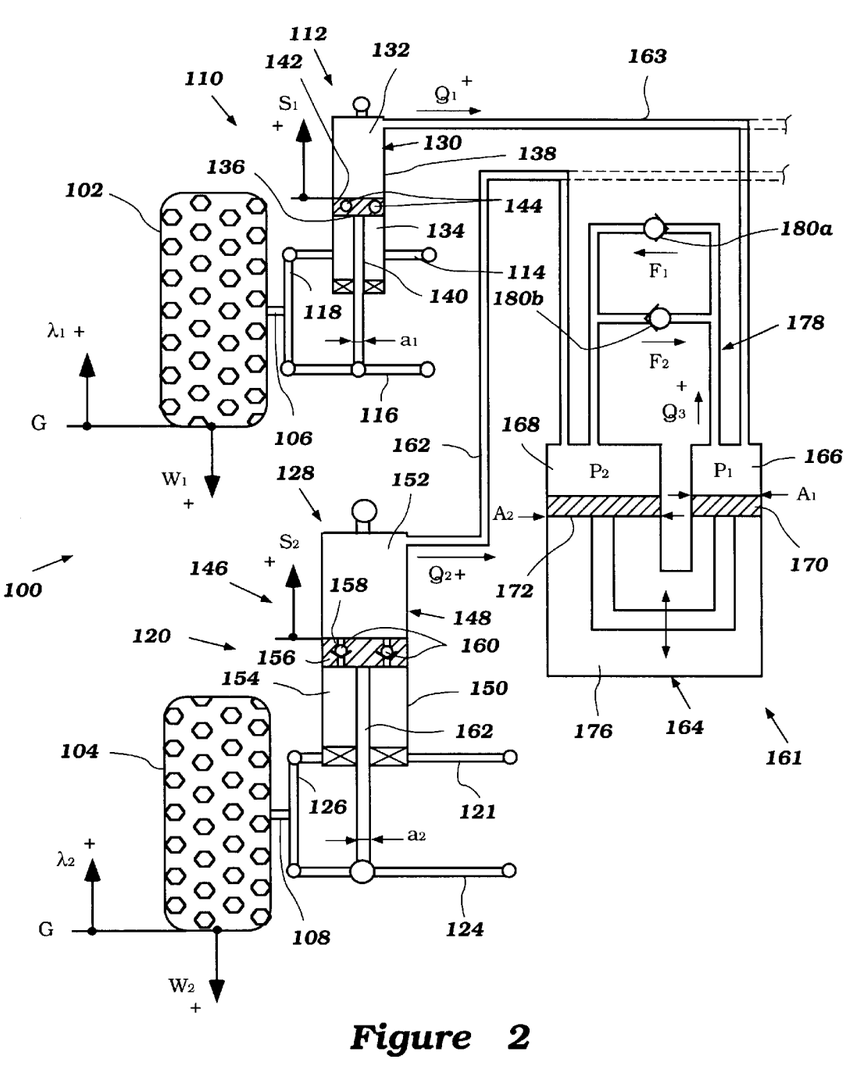
FIG. 2 is a schematic illustration of a suspension system arranged and configured in accordance with certain features, aspects and advantages of the present invention.

A suspension system arranged and configured in accordance with certain features, aspects and advantages of the present invention is illustrated in FIG. 2. As will become apparent, the present invention will be described in the context of an automobile; however, it also should be readily apparent to those of ordinary skill in the art, that the present invention can also be modified for use in three-wheeled, four-wheeled and two-wheeled vehicles. Moreover, the present invention can be modified for use in other types of land vehicles where an accounting for pitching and rolling actions of the vehicle body as well as an accounting for movement of wheels or other driving members is desired.

Furthermore, the following description will deal with the interrelationship between a front wheel and a rear wheel of a vehicle. In the illustrated embodiment, the front wheel and rear wheel of the vehicle are located on the same side of the body of the vehicle. Of course, it is also contemplated that front wheel on one side of the vehicle body can be interrelated with a rear wheel on the other side of the vehicle body. It should be mentioned that several equalities will be set forth in equation form. These equalities will use the symbol "=". It is anticipated that any equality should be viewed as a substantial equality such that substantially equals results instead of equals. The margin by which substantially equals and equals can realistically differ will be appreciated by those of ordinary skill.

Moreover, the present invention can also be utilized in arrangements interrelating the front wheels of the vehicle and/or the rear wheels of the vehicle. By interrelating the front wheels of the vehicle and the rear wheels of the vehicle independently of one another, damping and controlling vehicle roll encountered when maneuvering, such as during cornering, in addition to normal individual wheel damping can be accomplished. When the front wheels and the rear wheels at each side of the vehicle are paired and interrelated, such as in the illustrated arrangement, the present invention can be used to control pitching, such as may occur when rapidly accelerating or rapidly decelerating.

With continued reference to FIG. 2, the present suspension system 100 is illustrated in the context of a wheeled vehicle, which comprises a front wheel 102 as well as a rear wheel 104. The illustrated wheels are shown resting on a reference plane G in the illustrated arrangement. While the rather schematic illustration presented in FIG. 2 shows two separate reference planes, the reference plane generally is the same level and the schematic illustration is designed to illustrate the component more than the particular vertical placement. The reference plane G will be used to describe displacement of the wheels 102, 104 and other components of the suspension system 100.

As is known to those in the automotive and related arts, the front wheel 102 and the rear wheel 104 are mounted on hubs (not shown) that revolve around an axle 106, 108, respectively.

The front wheel 102 and the axle 106 are mounted to a vehicle chassis (not shown) using a front suspension system 110, such as a wishbone or other suitable construction. The front suspension system preferably comprises a damper 112 that is positioned between a link of the front suspension system 110 and the vehicle body. In the illustrated arrangement, the front suspension system 110 comprises an upper arm 114 and a lower arm 116 which are joined together by a knuckle 118. In this configuration, the damper 112 extends between one of the upper arm 114 and the lower arm 116 and the chassis or frame of the vehicle. Preferably, the damper 112 extends between the lower arm 116 and the frame of the vehicle. As will be recognized, the particular orientation and location of the damper 112 along the lower arm 116 can have an impact upon a front wheel lever ratio, which will be discussed below.

Similarly, the rear wheel 104 and the axle 108 are mounted to the vehicle body using a rear suspension system 120. The rear suspension system 120 comprises an upper arm 122, a lower arm 124, a knuckle 126, and a rear damper 128. In the illustrated arrangement, the rear damper 128 extends between the vehicle frame and the lower arm 124.

As discussed above, the particular orientation and placement along the lower arm 124 can have an impact upon a rear wheel lever ratio, which will be discussed below. The particular configuration of the rear suspension system, however, may vary.

With continued reference to FIG. 2, the junction between the front damper 112 and the lower arm 116 is substantially closer to the end of the lower arm that joins to the vehicle frame when compared to the junction between the rear damper 128 and the respective lower arm 124.

Both of the dampers 112, 128 are similarly constructed. Importantly, however, the actual sizing of the dampers preferably differs between the front damper and the rear damper. The sizing of the dampers can vary depending upon the application and the weight distribution.

The front damper 112 is generally comprised of a cylinder 130 in which a first chamber 132 and a second chamber 134 are defined. More particularly, in the illustrated arrangement, the first chamber 132 and the second chamber 134 are separated by a piston 136 that can move up and down within a cylinder bore 138, which is defined by the cylinder 130. Furthermore, in the illustrated arrangement, the piston 136 is interconnected with at least one of the upper 114 and lower arms 116. More particularly, the piston 136 comprises a piston rod 140 that is connected to the lower arm 116 in the illustrated arrangement. The piston rod 140 reciprocates along with the piston 136 within the cylinder bore 138. More particularly, as the wheel 102 raises and lowers, the arms 114, 116 and the knuckle 118 also raises and lowers. The movement of the arms 114, 116 and the knuckle 118 results in corresponding movement of the piston 136 relative to the cylinder 130.

In the illustrated arrangement, the piston 136 further comprises at least one passage 142 in which a valve 144 is positioned to control the flow into or out of either chamber 132, 134. In some configurations, the valve may be configured similar to a check valve in which flow can proceed in one direction and the sizing can differ such that differing damping ratios are formed by the use of differing size valves that control flow in only a single direction. Of course, the passages 142 and the valves 144 may be individually controllable such that the ratios can be actively controlled. However, this arrangement results in a more complicated construction and need not be used in the implementation of a suspension system having features, aspects and advantages in accordance with the present invention. In fact, the simplified nature of the suspension system described herein is one of the distinct advantages of this suspension system over other more complex systems that are used to actively control suspension of a vehicle.

Movement of the piston 136 and the piston rod 140 cause movement of fluid that is contained within the first chamber 132 and the second chamber 134. For instance, as the piston is retracted into the cylinder (i.e., upward movement in the illustrated arrangement), a portion of the volume of the second or lower chamber 134 is occupied by the piston rod 140. This portion of the fluid that was contained within the first or upper chamber 132, therefore, is displaced by the piston rod 140. Furthermore, as the piston is extended out of the cylinder (i.e., downward movement in the illustrated arrangement), a portion of the volume of the second chamber 134 that previously was occupied by the piston rod 140 becomes vacant in the first chamber 134. Accordingly, the portion of the fluid that was displaced by the piston rod 140 can return to the first chamber 132. In addition, the movement of the piston 136 relative to the cylinder 130 can causes a small displacement of fluid from the chamber 132, 134 in the direction of which the piston is travelling.

With continued reference to FIG. 2, the rear suspension system 120 is similarly configured to the front suspension system 110. Thus, the rear suspension system 120 comprises a cylinder 148 that defines within it a cylinder bore 150, which can be subdivided into a first chamber 152 and a second chamber 154. As described above, a piston 156 generally segregates the first chamber 152 from the second chamber 154. The piston can include one or more apertures 158 that contain throttle valves 160. The valves 160 in the illustrated arrangement are configured such that one is an inflow valve and one is an outflow valve. In other words, one valve allows flow from the first chamber 152 to the second chamber 154 while the other valve allows flow from the second chamber 154 to the first chamber 152. These valves can be similarly designed so that the same amount of flow occurs between the two chambers or these valves can be disparately designed so that the flow to one chamber has a first flow rate while the flow to the second chamber has a second flow rate.

The piston 156 is linked to the balance of the rear suspension system 120 and, in particular to the lower arm 124, with a piston rod 162. The piston rod 162 translates movement, which is typically of the pivotal nature, from the lower arm 124 to the piston 156 which will then reciprocate within the cylinder bore 150. Reciprocation of the piston 156 within the cylinder bore 150 results in the displacement of fluid either through the valves 160 or through a conduit 162 that is connected to a pressure regulating unit 164.

With continued reference to FIG. 2, the pressure regulating unit 164 generally comprises a first chamber 166 and a second chamber 168. In the illustrated arrangement, the first chamber 166 is connected to the front damper 112 through a conduit 163 while the second chamber 168 is directly connected to the rear damper 146 through the conduit 162. A joint piston having a pair of piston heads 170, 172 also is provided within the pressure regulating unit 164. The piston heads 170, 172 are joined to a piston rod 174 that ensures that the two piston heads 170, 172 translate together within the respective chambers 160, 168. Advantageously, the construction illustrated in FIG. 2 provides a frame of reference in which movement of the heads 170, 172 can be measured.

Preferably, a third chamber 176 is defined within the pressure regulating unit 164. The third chamber 176 can be filled with a high pressure gas and is the chamber in which the piston rod 174 is positioned. The high pressure gas can have a pressure $P_0$ while the first chamber 166 can have a pressure $P_1$ and the second chamber 168 can have a pressure $P_2$.

The first chamber 166 and the second chamber 168 are interconnected with a bypass unit 178. In the illustrated arrangement, the bypass unit 178 comprises a plurality of conduits in which a set of throttle valves 180a, 180b are positioned. The throttle valves 180a, 180b are disposed to control flow depending upon the direction of flow between the first chamber 166 and the second chamber 168. Of course, the flow of oil from one chamber to the other depends upon differences between the pressures $P_1$ and $P_2$. In other words, the valve 180b controls movement of oil from the second chamber 168 to the first chamber 166, while the valve 180a controls movement of the oil from the first chamber 166 to the second chamber 168. This arrangement advantageously equalizes pressure over time between the two chambers 166, 168.

As mentioned above, the lever ratio is defined in terms of movements of relative components of the suspension system. In particular, the lever ratio is generally the vertical movement of the piston within the cylinder (i.e., 136 and 130) over the displacement of the wheel (i.e., 102) relative to a reference point, such as G. In the illustrated arrangement, the ratio can be defined as $S_1/\lambda_1$ wherein $S_1$ represents the vertical displacement of the piston 136 and piston rod 140 and $\lambda_1$ represents the vertical displacement of the wheel 102.

It has been predicted that simply changing the configurations (i.e., the relative sizing of components, etc.) of the front suspension system and the rear suspension system relative to one another does not result in equal volumetric displacement by the pistons 136, 156 although movement of the pistons 136, 156 may be substantially the same. Such incongruent movement of the piston heads 170, 172 can result in the undesirable flow of oil between the first chamber 166 and the second chamber 168 because the differing amounts of displaced oil can increase the pressure in one of the chambers over the other. The resulting flow through the bypass passages 178 causes an increase in damping force as the oil flows through at least one of the valves 180a, 180b.

Applicant recently has discovered a solution to this dilemma. The undesired increase in damping force can be prevented or substantially reduced if the suspension system is designed to satisfy the following equation $$\left(\frac{S_1}{\lambda_1}\right) \times \left(\frac{a_1}{A_1}\right) = \left(\frac{S_2}{\lambda_2}\right) \times \left(\frac{a_2}{A_2}\right) \qquad \text{Equation 1}$$

wherein $S_1$ and $S_2$ represent the vertical movement of the pistons 136, 156, respectively, $\Lambda_1$ and $\Lambda_2$ represent the vertical movement of the wheels from the reference plane G, $a_1$ and $a_2$ represent the effective areas of the pistons 136, 156, and $A_1$ and $A_2$ represent the effective cross-sectional area of the pistons within the pressure regulation unit 164. The effective cross-sectional area of the pistons is the cross-sectional area which results in a displacement of fluid. Thus, if fluid can flow through apertures formed in a piston head, the piston rod will volumetrically displace fluid and the cross-sectional area of the piston rod becomes the effective cross-sectional area. Similarly, if no fluid were allowed to pass through the piston from one chamber to another, then the cross-sectional area of the piston head would be the effective cross-sectional area.

In other words, the suspension systems 110, 120 and the pressure regulating system 161 are designed so that the product of the lever ratio of the front suspension system and the ratio of the effective cross-sectional areas of the pistons within the pressure regulating unit 164 and the piston within the damper units is approximately the same as the product of the lever ratio of the rear suspension system and the ratio of the effective cross-sectional area of the pressure regulating piston in the pressure regulating unit 164 to the piston 156 of the second damper 146. Such a construction substantially prevents or greatly reduces the unnecessary damping force generated when the working oil is required to flow through the throttle valves 180a, 180b if the displacement directions and the displacement amounts $\lambda_1$, $\lambda_2$ of the front and rear wheels 102, 104 are approximately the same regardless of whether the effective cross-sectional areas $a_1$, $a_2$ of the pistons 136, 156 within the dampers 112, 128 are the same and regardless of whether the ratios of piston travel $S_1$, $S_2$ to wheel displacement amounts $\lambda_1$, $\lambda_2$ are the same between the suspension systems 110, 120.

It should also be noted that typically when the front piston 136 is contracted and the rear piston 156 is extended (as in a panic break) or, on the contrary, when the front piston 136 is extended and the rear piston 156 is contracted (as in rapid acceleration), damping forces are produced within the pressure regulating unit 164 while oil flows through the bypass passage 178 and the associated throttle valves 180a, 180b. It has been discovered that, unless the damping force under rapid breaking is approximately the same as the damping force in a rapid acceleration, vertical movement of the vehicle body cannot be controlled appropriately. Applicant has proved that the appropriate control of the vehicle body during pitching (i.e., the rear wheel and the front wheel displacing in mutually opposite directions at approximately the same displacement speed, such as $d\lambda_1/dt=-d\lambda_2/dt$) can be realized when a suspension system is constructed to satisfy the following equation, which is based upon Equation 1:

$$\left(\frac{S_1}{\lambda_1}\right) \times \left(\frac{a_1}{A_1}\right) \times \Delta\phi = -\left(\frac{S_2}{\lambda_2}\right) \times \left(\frac{a_2}{A_2}\right) \times \Delta\phi' \qquad \text{Equation 2}$$

In Equation 2, $\Delta\phi$ represents the differential pressure ($P_1-P_2$) between the first chamber 166 and the second chamber 168, which would cause oil to flow from the first chamber 166 to the second chamber 166.

Equation 2 is derived by obtaining a first condition under which the damping force $F_1$ produced by the first throttle valve 180a during rapid deceleration is equal to the damping force $F_2$ produced through the second throttle valve 180b during rapid acceleration, obtaining a second condition under which the damping force $F_2$ produced through the second throttle valve 180b during rapid deceleration is equal to the damping force $F_1$ produced through the first throttle valve 180a during the rapid acceleration. These two conditions are then evaluated to find a condition under which the two are substantially satisfied at the same time. The equation will be derived below.

When deriving the equation, it is assumed that the vertical displacement speeds of the wheels at the ground contact points are the same in absolute value and represent movement in opposite directions (i.e., $d\lambda_1/dt=-d\lambda_2/dt$).

To begin with, the condition in which the front piston 136 is compressed and the rear piston 156 is extended will be evaluated. Under this condition, it is assumed that $F_1$ is the damping force produced through the first throttle valve 180a and $F_2$ is the damping force produced through the second throttle valve 180b during compression of the front piston 136 and extension of the rear piston 156. Such a situation would occur during rapid acceleration. In other words, $\lambda_1/dt>0$, $\lambda_2/dt<0$ would occur. Therefore, $F_1$ can be expressed as follows:

$$F_1(\lambda_1/dt>0, \lambda_2/dt<0)=a_1 \times (P_1-P_0) \times (S_1/\lambda_1) \qquad \text{Equation 3}$$

Similarly, F2 can be expressed as follows:

$$F_2(\lambda_1/dt>0, \lambda_2/dt<0)=a_2 \times (P_2-P_0) \times (S_2/\lambda_2). \qquad \text{Equation 4}$$

Then the differential pressure through the pressure regulating unit 164 can be expressed as follows:

$$P_1-P_2=\Delta P. \qquad \text{Equation 5}$$

Therefore, the oil pressure working on the free piston (i.e., the piston heads 170, 172) of the pressure regulating unit 164 can be expressed as follows:

$$P_1 \times A_1 + P_2 \times A_2 = P_0 \times (A_1+A_2) \qquad \text{Equation 6}$$

From Equations 3, 4 and 6, the following can be derived:

$$F_1(\lambda_1/dt>0, \lambda_2/dt<0)=a_1 \times \Delta P \times A_2 \times (S_1/\lambda_1)/(A_1+A_2) \qquad \text{Equation 7}$$

Similarly, from Equations 4, 5 and 6, the following can be derived:

$$F_2(\lambda_1/dt>0, \lambda_2/dt<0)=-a_2 \times \Delta P \times A_1 \times (S_2/\lambda_2)/(A_1+A_2) \qquad \text{Equation 8}$$

Now, considering the situation in which $F_1'$ is the damping force produced through the first throttle valve 180a and $F_2'$ is the damping force produced through the second throttle valve 180b in situations involving rapid acceleration (i.e., the front wheel 102 moves down relative to the vehicle body and a rear wheel 104 moves up relative to the vehicle body). In other words, the situation can be described as $\lambda_1/dt<0$, $\lambda_2/dt>0$. In such situations, the damping force $F_1'$ can be expressed as follows:

$$F_1'(\lambda_1/dt<0, \lambda_2/dt>0)=a_1 \times (P_1'-P_0) \times S_1/\lambda_1 \qquad \text{Equation 9}$$

The damping force $F_2'$ similarly can be expressed as follows:

$$F_2'(\lambda_1/dt<0, \lambda_2/dt>0)=a_2 \times (P_2'-P_0) \times S_2/\lambda_2 \qquad \text{Equation 10}$$

Similar to that described above, the differential pressure through the pressure regulating unit 164 can be described as follows:

$$P_1'-P_2'=\Delta P' \qquad \text{Equation 11}$$

Moreover, the oil pressure that is working on the free piston (i.e., piston heads 170, 172) of the pressure regulating unit 164 can be expressed as follows:

$$P_1' \times A_1 + P_2' \times A_2 = P_0 \times (A_1+A_2) \qquad \text{Equation 12}$$

From the Equations 9, 10 and 12, it can be found that:

$$F_1'(\lambda_1/dt<0, \lambda_2/dt>0)=a_1 \times \Delta P' \times A_2 \times (S_1/\lambda_1)/(A_1+A_2) \qquad \text{Equation 13}$$

Similarly, from the Equations 10, 11 and 12, it can be found that:

$$F_2'(\lambda_1/dt<0, \lambda_2/dt>0)=-a_2 \times \Delta P' \times A_1 \times (S_2/\lambda_2)/(A_1+A_2) \qquad \text{Equation 14}$$

From the above equations, the condition under which the damping force $F_1$ produced through the first throttle valve 180a during rapid deceleration is equal to the damping force $F_2'$ produced through the second throttle valve 180b during rapid acceleration is that the Equation 7 is equal to the Equation 14. Because $$F_1(\lambda_1/dt>0, \lambda_2/dt<0)=F_2'(\lambda_1/dt<0, \lambda_2/dt>0)$$

the equality can be expressed as below:

$$\left(\frac{a_1}{A_1}\right) \times \left(\frac{S_1}{\lambda_1}\right) \times \Delta P = -\left(\frac{a_2}{A_2}\right) \times \left(\frac{S_2}{\lambda_2}\right) \times \Delta P' \qquad \text{Equation 15}$$

Similarly, the condition under which the damping force $F_2$ produced of the second throttle valve 180b during rapid deceleration is equal to the damping force $F_1'$ produced through the first throttle valve 180a during rapid acceleration is that the Equation 8 is equal to the Equation 13. Because, because $$F_2(\lambda_1/dt>0, \lambda_2/dt<0)=F_1'(\lambda_1/dt<0, \lambda_2/dt>0),$$

The equality can be expressed with the equation set forth below:

$$\left(\frac{a_1}{A_1}\right) \times \left(\frac{S_1}{\lambda_1}\right) \times \Delta P' = -\left(\frac{a_2}{A_2}\right) \times \left(\frac{S_2}{\lambda_2}\right) \times \Delta P \qquad \text{Equation 16}$$

Because the difference between Equations 15 and 16 is between $\Delta P$ and $\Delta P'$, which are the differential pressures between the pressure $P_1$ in the first chamber 166 and the pressure $P_2$ in the second chamber 168, $\Delta P$ and $\Delta P'$ or $\Delta P'$ and $\Delta P$ may be replaced with $\Delta \phi$ and $\Delta \phi'$. Making this replacement, the following equation is obtained:

$$\left(\frac{S_1}{\lambda_1}\right) \times \left(\frac{a_1}{A_1}\right) \times \Delta \phi = -\left(\frac{S_2}{\lambda_2}\right) \times \left(\frac{a_2}{A_2}\right) \times \Delta \phi \qquad \text{Equation 17}$$

Equation 17 is the same as Equation 2 set forth above. Accordingly, Equation 2 has been successfully derived.

The damping force characteristics of the first throttle valve 180a and the second throttle valve 180b can be obtained on the basis of the working oil flow rates through the bypass passages 178. In other words, the following equation can be used:

$$\frac{\left(\frac{dQ_1}{dt} - \frac{dQ_3}{dt}\right)}{A_1} = \frac{\left(\frac{dQ_2}{dt} - \frac{dQ_3}{dt}\right)}{A_2} \qquad \text{Equation 18}$$

This equation can be simplified into the equation listed below:

$$\frac{dQ_3}{dt} = \frac{\left(A_2 \times \frac{dQ_1}{dt} - A_1 \times \frac{dQ_2}{dt}\right)}{(A_1+A_2)} \qquad \text{Equation 19}$$

Figure 3:
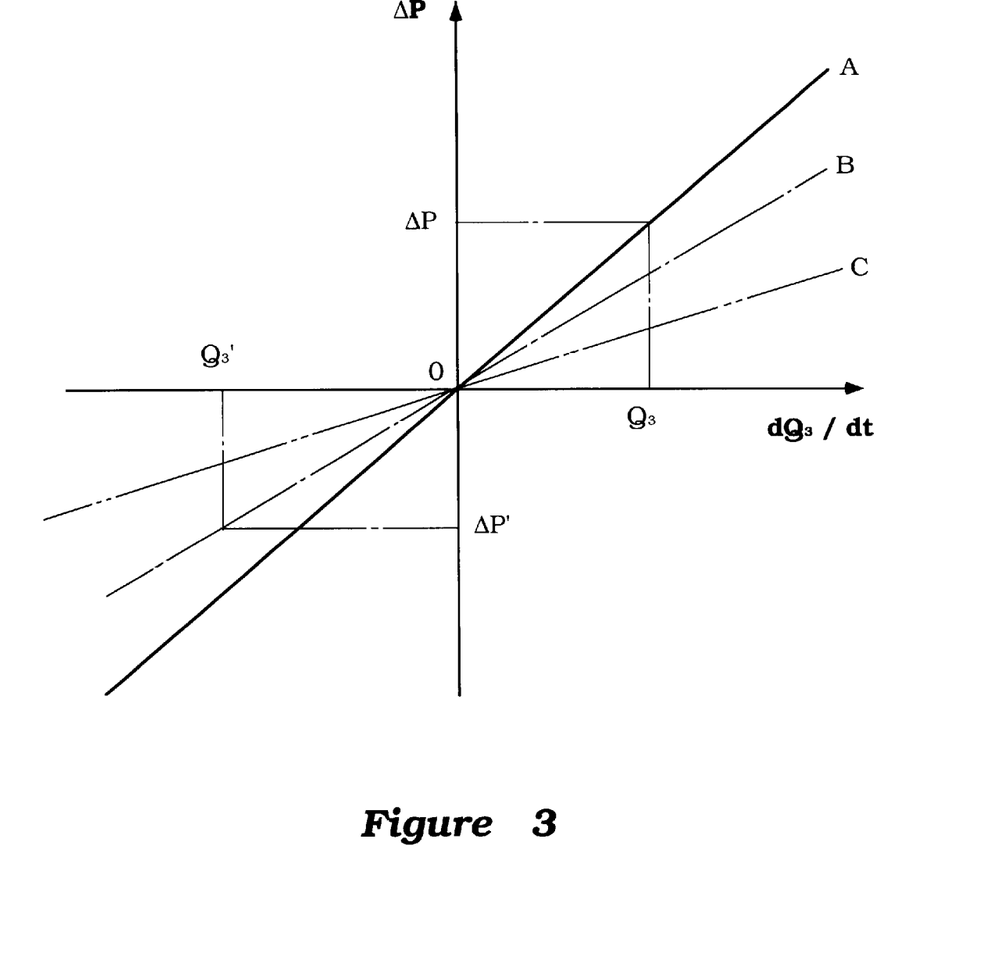
FIG. 3 is a graphical illustration of exemplary throttle valve characteristics. The graph presents information useful in selecting a preferred set of throttle valves for use with the suspension system illustrated in FIG. 2.

The damping force characteristics of the first and second throttle valves 180a, 180b are obtained by applying the values of $$\frac{dQ_3}{dt}$$

obtained though Equation 19 to the graph illustrated in FIG. 3.

FIG. 3 graphically represents the damping force characteristics experimentally obtained of three types of existing throttle valves A, B, and C. Of course, the three types are merely exemplary and any number of other types of throttle valves also can be profiled on the graph. The characteristics of these three throttle valves of the illustrated arrangement are represented respectively with a solid line, a dash and dot line, and a dash and double dot line. In the graph, the horizontal axis represents the value of $$\frac{dQ_3}{dt}$$

and the vertical axis represents changes in the oil pressure $\Delta P$. In the illustrated arrangement, the value of $Q_3$ (i.e., the displaced oil that flows through the bypass passage) obtained with Equation 19 listed above can be plotted on the graph and an appropriate throttle valve can be chosen from the three existing throttles A–C. The following will describe a procedure selecting the proper throttle valves for use in a suspension system, such as that described above and illustrated in FIG. 2.

The areas $A_1$ and $A_2$ of the pistons disposed within the pressure regulating unit 164 can be determined once the pressure regulator regulating unit 164 has been manufactured. The values of $A_1$ and $A_2$ then can be applied to Equation 19. The values $$\frac{dQ_1}{dt} \text{ and } \frac{dQ_2}{dt}$$

then can be determined based the specifications of the hydraulic cylinders 130, 146 for the front wheels 102 and the rear wheels 104, respectively. Moreover, these values can be based on the lever ratios of the front and rear suspension systems have been determined. Therefore, $$\frac{dQ_3}{dt}$$

(i.e., the flow rate through the bypass passages) can be obtained from Equation 19.

In some arrangements, the value $$\frac{dQ_3}{dt}$$

preferably is a value that corresponds to ordinary operation of an ordinary automobile. In addition, the value $Q_3$ can be obtained by specifying a time to the derived value $$\frac{dQ_3}{dt}.$$

The value $Q_3$ preferably is obtained depending on each of the working directions of the hydraulic cylinders (i.e., the movement of the pistons 136, 156 within the cylinder bodies). The values $Q_3$ corresponding to the working directions have been indicated as $q_3$ and $q_3'$ in the graphical representation of FIG. 3.

Using Equation 2, discussed above, the value of $\Delta P$ in FIG. 3 can be obtained. Generally, Equation 2 can be expressed as a ratio of $\Delta\phi$ to $\Delta\phi'$. That is because $S_1/\lambda_1$ and $a_1/A_1$ on the left side of the equation and $S_2/\lambda_2$ and $a_2/A_2$ on the right side of the equation are determined by the specifications of the manufactured hydraulic cylinders for the front and rear wheels along with the manufactured pressure regulating unit 164, these values can be obtained by calculation. Therefore, assuming $K_1$ to be the calculation result of the left side and $K_2$ to be that of the right side, the Equation 2 can be written in a different form as follows:

$K_1 \times \Delta\phi = K_2 \times \Delta\phi'$  Equation 20

The value of $\Delta\phi$ then can be replaced by $\Delta P$ and the value of $\Delta\phi'$ can be replaced by $\Delta P'$.

Turning again to FIG. 3, assuming that the throttle A is used in the ordinary use range of $q_3$, $\Delta P$ can be inserted into the transformed equation, Equation 20, to obtain a value of $\Delta P'$. By graphically transferring $\Delta P'$ into the graph of FIG. 3, a second throttle valve can be chosen that can provide a similar ordinary use range of $q_3'$. In the illustrated arrangement, the throttle A has been first selected as the first throttle valve 180a, while the throttle B is obtained as the second throttle valve 180b.

In the illustrated arrangement constructed in accordance with the above description and equalities, the flow of working oil through the bypass passages 178 can be substantially reduced or eliminated when the displacement directions and the displacement amounts of the front and rear wheels are approximately the same. This result occurs regardless of whether the cross-sectional areas $a_1$ and $a_2$ of the pistons 136, 156 are different from one another. In addition, this result occurs regardless of whether the ratios of piston stroke $S_1$, $S_2$ of the pistons 136, 156 to the displacement amounts $\lambda_1$, $\lambda_2$ of the front wheels 102 and rear wheels 104 are different. Thus, it is possible to construct the suspension system for the front and rear wheels to adapt to the weight distribution within the vehicle while retaining the function of a relatively increasing or decreasing damping force, depending upon movement of the vehicle body.

In addition, the above described suspension system for the front and rear wheels 102, 104 is also constructed so that when the front wheels 102 and the rear wheels 104 are displaced in opposite directions relative to the vehicle body at substantially the same displacement speed (i.e., the absolute values of the displacement speeds), the damping characteristics of the suspension system does not substantially change. Thus, it is possible to prevent the damping characteristics of the throttle valves from changing depending upon the working oil flow direction regardless of whether the cross-sectional areas $a_1$ and $a_2$ of the pistons 136, 156 are different, whether the lever ratios of the suspension system for the front wheels 102 and the rear wheels 104 are different, and whether the effective cross-sectional areas $A_1$ and $A_2$ of the first and second piston heads 170, 172 are different.

Another feature of the present invention involves accounting for the static ground contact loads of the front wheel 102 and rear wheel 104, respectively. Because this aspect of the present invention involves the same general construction of the suspension system as described above, this description will also make reference to FIGS. 1 and 2.

This aspect of the present invention deals with the damping forces produced in proportion to the inertia mass of the vehicle body. It has been suggested that unless the damping force produced by the respective throttles changes in proportion to the inertia mass of the vehicle body, the oscillation damping of the vehicle body is inadequate. In other words, unless the damping force is produced with the first throttle valve 180a and the second throttle valve 180b are approximately the same on the basis of per unit inertia mass expected during rapid deceleration and rapid acceleration, the oscillation of the vehicle body cannot be adequately controlled. Conversely, adequate control can be realized by constructing the suspension system to satisfy the conditions of the following equation when the vehicle body pitches (i.e., the front wheels 102 and the rear wheels 104 moving in mutually opposite directions at approximately the same absolute speed).

$$\left(\frac{S_1}{\lambda_1}\right) \times \left(\frac{a_1}{A_1}\right) \times \frac{\Delta\phi}{W_1} = -\left(\frac{S_2}{\lambda_2}\right) \times \left(\frac{a_2}{A_2}\right) \times \frac{\Delta\phi'}{W_2} \quad \text{Equation 21}$$

In Equation 21, $\Delta\phi$ represents the differential pressure ($P_1 - P_2$) between the first chamber 166 and the second chamber 168 when the working oil flows from the first chamber 166 to the second chamber 168. Similarly, $\Delta\phi$ represents the differential pressure ($P_2 - P_1$) between the second chamber 168 and the first chamber 166 when the working oil flows from the second chamber 168 to the first chamber 166.

Equation 21 can be derived by obtaining a first condition under which the damping force produced through the first throttle valve 180a during rapid deceleration is equal to the damping force produced through the second throttle valve 180b during rapid acceleration. Next, a second condition can be obtained under which the damping force produced through the second throttle valve 180b during rapid deceleration is equal to the damping force produced through the first throttle valve 180a during rapid acceleration. Then, these two conditions can be arranged to be simultaneously satisfied. The process of deriving this equation is set forth below. When deriving this equation, it is assumed that the vertical displacement speeds of the wheels at the ground contact points are the same in absolute value and opposite in direction (i.e., $d\lambda_1/dt=-d\lambda_2/dt$).

Deriving the first condition may be done as follows. First, it is assumed that $F_1$ is a damping force produced through the first throttle valve 180a and $F_2$ is the damping force produced through a second throttle valve 180b. Of course, this is assuming that the front wheel 102 moves up relative to the vehicle body and the rear wheel 104 moves down relative to the vehicle body, such as would occur during a rapid deceleration. In short, this case would require that ($\lambda_1/dt>0$, $\lambda_2/dt<0$). The damping force $F_1$ can then be expressed as follows:

$$F_1(\lambda_1/dt>0, \lambda_2/dt<0)=a_1\times(P_1-P_0)\times S_1/\lambda_1 \quad \text{Equation 22}$$

Similarly, the damping force $F_2$ can be expressed as follows:

$$F_1(\lambda_1/dt>0, \lambda_2/dt<0)=a_1\times(P_1-P_0)\times S_1/\lambda_1 \quad \text{Equation 23}$$

Then the differential pressure through the pressure regulating unit 164 can be expressed as follows:

$$P_1-P_2=\Delta P. \quad \text{Equation 24}$$

Therefore, the oil pressure working on the free piston (i.e., the piston heads 170, 172) of the pressure regulating unit 164 can be expressed as follows:

$$P_1\times A_1+P_2\times A_2=P_0\times(A_1+A_2) \quad \text{Equation 25}$$

From Equations 22, 23 and 25, the following can be derived:

$$F_1(\lambda_1/dt>0, \lambda_2/dt<0)=a_1\times\Delta P\times A_2\times(S_1/\lambda_1)/(A_1+A_2) \quad \text{Equation 26}$$

Similarly, from Equations 23, 24 and 25, the following can be derived:

$$F_2(\lambda_1/dt>0, \lambda_2/dt<0)=-a_2\times\Delta P\times A_1\times(S_2/\lambda_2)/(A_1+A_2) \quad \text{Equation 27}$$

Now, considering the situation in which $F_1'$ is the damping force produced through the first throttle valve 180a and $F_2'$ is the damping force produced through the second throttle valve 180b in situations involving rapid acceleration (i.e., the front wheel 102 moves down relative to the vehicle body and a rear wheel 104 moves up relative to the vehicle body). In other words, the situation can be described as $\lambda_1/dt<0$, $\lambda_2/dt>0$. In such situations, the damping force $F_1'$ can be expressed as follows:

$$F_1'(\lambda_1/dt<0, \lambda_2/dt>0)=a_1\times(P_1'-P_0)\times S_1/\lambda_1 \quad \text{Equation 28}$$

The damping force $F_2'$ similarly can be expressed as follows:

$$F_2'(\lambda_1/dt<0, \lambda_2/dt>0)=a_2\times(P_2'-P_0)\times S_2/\lambda_2 \quad \text{Equation 29}$$

Similar to that described above, the differential pressure through the pressure regulating unit 164 can be described as follows:

$$P_1'-P_2'=\Delta P' \quad \text{Equation 30}$$

Moreover, the oil pressure that is working on the free piston (i.e., piston heads 170, 172) of the pressure regulating unit 164 can be expressed as follows:

$$P_1'\times A_1+P_2'\times A_2=P_0\times(A_1+A_2) \quad \text{Equation 31}$$

From the Equations 28, 30 and 31, it can be found that:

$$F_1'(\lambda_1/dt<0, \lambda_2/dt>0)=a_1\times\Delta P'\times A_2\times(S_1/\lambda_1)/(A_1+A_2) \quad \text{Equation 32}$$

Similarly, from the Equations 29, 30 and 31, it can be found that:

$$F_2'(\lambda_1/dt<0, \lambda_2/dt>0)=-a_2\times\Delta P'\times A_1\times(S_2/\lambda_2)/(A_1+A_2) \quad \text{Equation 33}$$

The unit inertia mass at the damper of each of the front suspension unit 110 and the rear suspension unit 128 is the static ground contact load $W_1$ or $W_2$ multiplied by a certain constant $\alpha$. Because the constant $\alpha$ is the same for all dampers, the constant $\alpha$ can be neglected during derivation (i.e., it would cancel out of the equation). Therefore, the damping force per unit inertia mass produced through the first throttle valve 180a during rapid deceleration is assumed to be $F_1/W_1$ while the damping force per unit inertia mass produced through the second throttle valve 180b during rapid acceleration is assumed to be $F_2'/W_2$. The aforementioned first condition (under which the damping force per unit inertia mass $F_1/W_1$ produced through the first throttle valve 180a during rapid deceleration is equal to the damping force per unit inertia mass $F_2'/W_2$ produced through a second throttle valve 180b during rapid acceleration) can be obtained by setting Equations 26 and 33 equal to each other. Because $$\frac{F_1}{W_1}\times\left(\frac{\lambda_1}{dt}>0, \frac{\lambda_2}{dt}<0\right) = \frac{F_2'}{W_2}\left(\frac{\lambda_1}{dt}<0, \frac{\lambda_2}{dt}>0\right) \quad \text{Equation 34}$$

the equality can be expressed with the following equation:

$$\left(\frac{a_1}{A_1}\right)\times\left(\frac{S_1}{\lambda_1}\right)\times\frac{\Delta P}{W_1} = -\left(\frac{a_2}{A_2}\right)\times\left(\frac{S_2}{\lambda_2}\right)\times\frac{\Delta P'}{W_2} \quad \text{Equation 35}$$

The second condition under which the damping force per unit inertia mass $F_2/W_2$ produced through the second throttle valve 180b during rapid deceleration is equal to the damping force per unit inertia mass $F_1'/W_1$ produced through the first throttle valve 180a during rapid deceleration can be obtained by setting Equation 27 equal to Equation 32. Because $$\frac{F_2}{W_1}\left(\frac{\lambda_1}{dt}>0, \frac{\lambda_2}{dt}<0\right) = \frac{F_1'}{W_1}\left(\frac{\lambda_1}{dt}<0, \frac{\lambda_2}{dt}>0\right) \quad \text{Equation 36}$$

the relationship can be expressed with the following equation:

$$\left(\frac{a_1}{A_1}\right)\times\left(\frac{S_1}{\lambda_1}\right)\times\frac{\Delta P'}{W_1} = -\left(\frac{a_2}{A_2}\right)\times\left(\frac{S_2}{\lambda_2}\right)\times\frac{\Delta P}{W_2} \quad \text{Equation 37}$$

Because the difference between the Equations 35 and 37 is between $\Delta P$ and $\Delta P'$, these values can be replaced by $\Delta\phi$ and $\Delta\phi'$, as discussed above.

The damping force characteristics of the first and second throttle valves 180a, 180b are then obtained with the same procedure as that described above and referencing FIG. 3. Therefore, the description of the procedure for obtaining the damping force characteristics of the first and second throttle valves 180*a*, 180*b* will not be further described.

In this arrangement, the suspension system 100, which comprises the front suspension system 110 and the rear suspension system 128 are constructed so that $$\left(\frac{S_1}{\lambda_1}\right) \times \left(\frac{a_1}{A_1}\right) \times \frac{\Delta\Phi}{W_1} = -\left(\frac{S_2}{\lambda_2}\right) \times \left(\frac{a_2}{A_2}\right) \times \frac{\Delta\Phi'}{W_2} \qquad \text{Equation 38}$$

when the front and rear wheels are displaced in generally opposite directions relative to the vehicle body and the absolute values of the displacement speeds are the same. Thus, it is possible to prevent the extra damping characteristic of the throttle valves in the pressure regulating unit from changing depending upon the working oil flow directions, even in at least one of the cases wherein: cross-sectional areas $a_1$ and $a_2$ of the pistons 136, 156 are different, the aesthetic ground contact loads $W_1$ and $W_2$ are different, the lever ratios of the suspension systems 110, 128 are different, and the effective cross-sectional areas $A_1$ and $A_2$ of the two piston heads 170, 172 are different.

Figure 4:
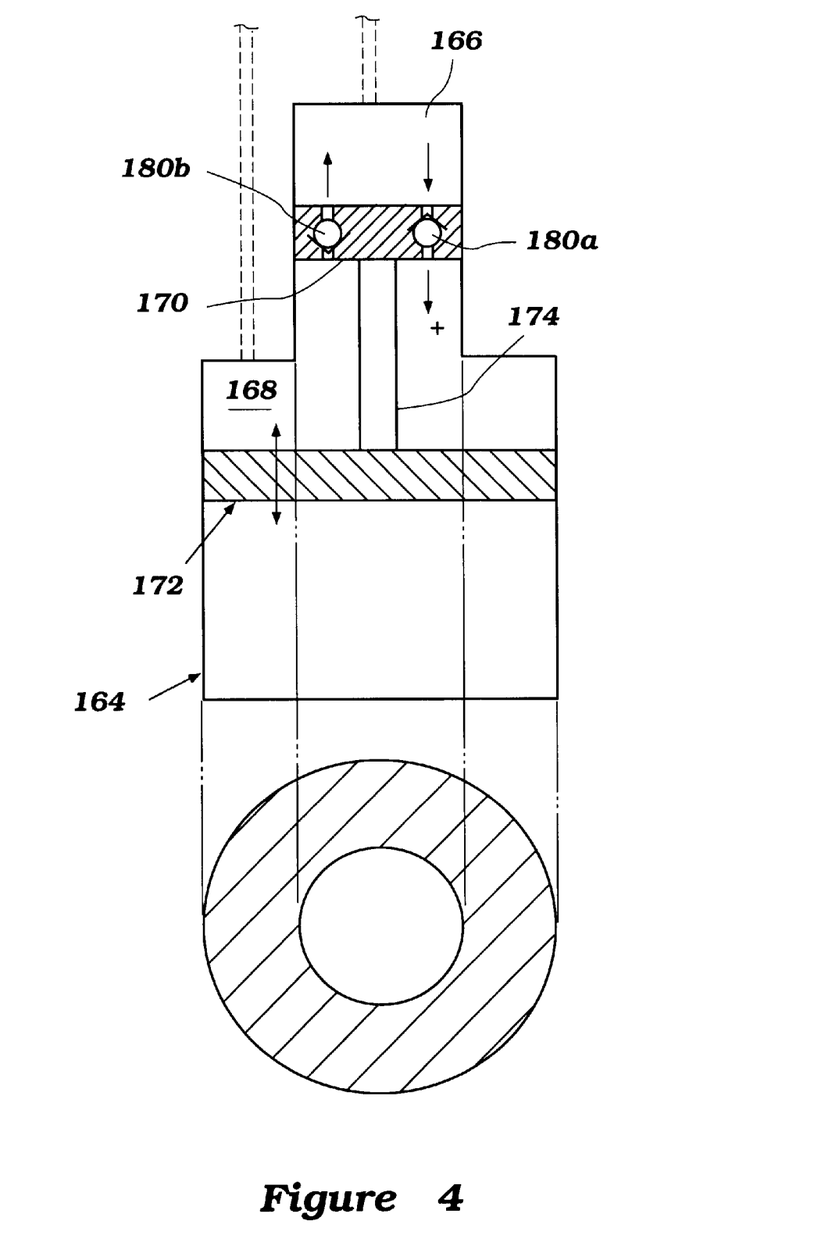
FIG. 4 is a first construction of a pressure regulation unit arranged and configured in accordance with certain features, aspects and advantages of the present invention.
Figure 5:
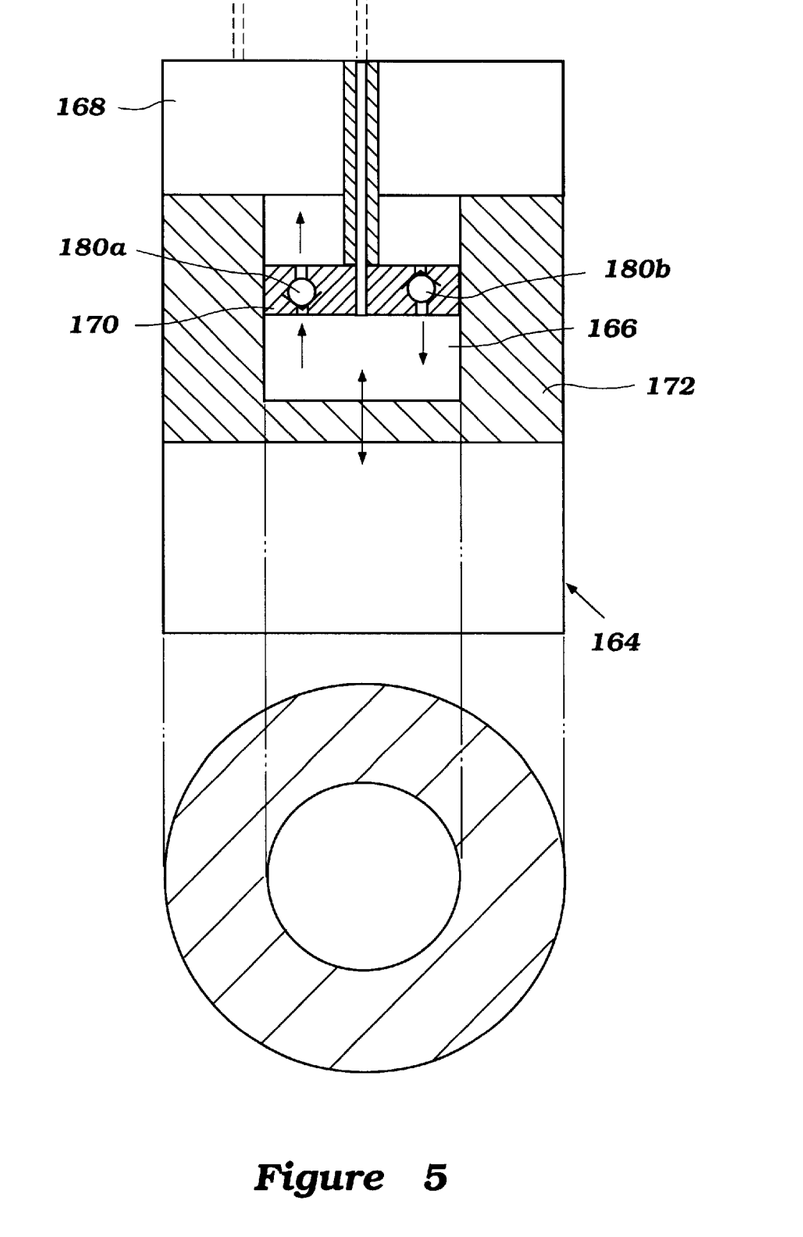
FIG. 5 is another construction of a pressure regulation unit having certain features, aspects and advantages in accordance with the present invention.

With reference now to FIGS. 4 and 5, two additional presently preferred constructions of a pressure regulating unit 164 are illustrated therein. In this description, for efficiency sake, like reference numerals will be applied like components and the detailed description of similar components will be omitted. The pressure regulator 164 illustrated in FIG. 4 generally comprises the first chamber 166 and the second chamber 168, both of which are positioned along substantially the same axial line. Accordingly, the first piston head 170 and the second piston head 172 are positioned along substantially the same axial line and interconnected using a connecting rod 174. The piston 170 of the first chamber 166 comprises the first and second throttle valves 180*a*, 180*b*.

With reference now to FIG. 5, the pressure regulating unit 164 illustrated therein comprises the first chamber 166, which is disposed within the second piston head 172 that defines the second chamber 168. The first piston head 170 is arranged for reciprocation within a pocket defined within the second piston head 172. In addition, the throttle valves 180*a*, 180*b* are disposed within the first piston head 170. Preferably, the piston 170 is fixed relative to a portion of the cylinder such that movement within the cylinder bore of the second piston head 172 alters the volume within the first chamber 166.

It is envisioned that in some arrangements, the hydraulic cylinders used in the front or first damper 112 and used in the rear damper 146 can be constructed such that the throttle valve 144 or 160 can be removed. In other words, the front damper or rear damper can be designed such that the use of the throttle valves may be unnecessary. Such a construction could involve positioning only one oil chamber within the cylinder body with that oil chamber being connected to the pressure regulator. When such a construction is employed, the effective cross-sectional areas, $a_1$ and $a_2$ of the pistons become the effective cross-sectional area of the pistons 136, 156 because those areas become the areas that displace the fluid or gas from within the cylinders.

Another construction of the pressure regulator unit 164 comprises positioning a high pressure gas chamber 176 that can be connected to or in fluid communication with a further chamber in which a further piston is arranged. The further piston can divide a high pressure chamber from a working oil chamber and the high pressure gas chamber 176 of the pressure regulating unit 164 is in fluid communication with the working oil chamber. In such a configuration, the high pressure chamber 176 of the pressure regulating unit 164 will be filled with the working oil that can be communicated back and forth between the high pressure chamber and the additional working fluid chamber. This arrangement will give a further degree of lost motion in the pressure regulating unit 164.

It also is anticipated that when the cross-sectional area $a_1$ of the piston of the front hydraulic cylinder is nearly the same as that of the piston of the rear hydraulic cylinder, similar effects to those described above can be obtained simply by determining the lever ratios of the suspension systems and the effective cross-sectional areas $A_1$ and $A_2$ of the pressure regulating unit 164, such that the following equation could be satisfied:

$$\frac{\left(\frac{S_1}{\lambda_1}\right)}{A_1} = \frac{\left(\frac{S_2}{\lambda_2}\right)}{A_2}$$

Similarly, if the lever ratios $(S_1/\lambda_1)$ of the front wheel 102 and suspension system 110 and lever ratio $(S_2/\lambda_2)$ of the rear wheel 104 and suspension system 120 are approximately the same, then similar effects to those described above can be obtained by determining the cross-sectional areas $a_1$ and $a_2$ of the pistons near the effective cross-sectional areas $A_1$ and $A_2$ of the pressure regulating cylinders such that the following equation is satisfied:

$$\frac{a_1}{A_1} = \frac{a_2}{A_2}$$

As will be appreciated, the flow through the bypass passage (which includes the damping throttle valves 180*a*, 180*b*) can be substantially prevented when both of the interrelated wheels move in substantially the same direction by substantially the same amount. Such a result occurs regardless of whether the first cylinder and the second cylinder are similar sized, constructed or mounted. In some arrangements described above, the damping characteristic of the throttle valves can remain the same regardless of which direction fluid flows in the suspension system. This result inures regardless of whether or not the cylinders of the front suspension system and the rear suspension system are similarly constructed or sized. Thus, the degrees of freedom available in designing a suitable suspension system can be expanded. According, the suspension system can be better tailored for differing applications that will account for differences in weight distribution while retaining the function of appropriately and relatively increasing and decreasing the damping forces depending upon the movement of the vehicle body.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A vehicle suspension system comprising a first damper and a second damper, said first damper and said second damper being interrelated, said first damper comprising a first piston and a first cylinder body, a first cylinder bore being defined by said first cylinder body, said first piston arranged to reciprocate within said first cylinder bore, said first piston having a first effective area $a_1$, said first damper extending between a first wheel and a vehicle body, said second damper comprising a second piston and a second cylinder body, a second cylinder bore being defined by said second cylinder body, said second piston being arranged to reciprocate within said second cylinder bore, said second piston having a second effective area $a_2$, said second damper extending between a second wheel and said vehicle body, a first chamber being defined within said first cylinder body at least in part by said first piston, a second chamber being defined within said second cylinder body at least in part by said second piston, a first pressure regulating cylinder being in fluid communication with said first chamber and a second pressure regulating cylinder being in fluid communication with said second chamber, said first pressure regulating cylinder comprising a first variable volume chamber and said second pressure regulating cylinder comprising a second variable volume chamber, said first variable volume chamber and said second variable volume chamber being defined at least in part by a single moveable member, said single moveable member having a first subarea $A_1$ that corresponds to said first variable volume chamber and a second subarea $A_2$ that corresponds to said second variable volume chamber, a bypass passage extending between said first variable volume chamber and said second variable volume chamber and a first throttle valve and a second throttle valve being positioned within said bypass passage, said suspension system being configured such that $$\left(\frac{S_1}{\lambda_1}\right) \times \left(\frac{a_1}{A_1}\right) = \left(\frac{S_2}{\lambda_2}\right) \times \left(\frac{a_2}{A_2}\right),$$

wherein $S_1$ and $S_2$ are a piston travel of said first piston and said second piston respectively and $\lambda_1$ and $\lambda_2$ are the travel of said first wheel and said second wheel respectively and wherein $a_1$ is not the same as $a_2$ or $S_1/\lambda_1$ is not the same as $S_2/\lambda_2$.

2. The suspension system of claim 1 further comprising a first piston rod extending from said first piston and a second piston rod extending from said second piston, said effective areas $a_1$ and $a_2$ of said first piston and said second piston comprising a cross-sectional area of said first piston rod and said second piston rod respectively.

3. The suspension system of claim 1, wherein a first passage extends through said first piston such that a third chamber is defined within said first cylinder body at least partially by said piston.

4. The suspension system of claim 3, wherein a second passage extends through said second piston such that a fourth chamber is defined within said second cylinder body at least partially by said piston.

5. The suspension system of claim 4, wherein a throttle valve is disposed along said second passage.

6. The suspension system of claim 3, wherein a throttle valve is disposed along said first passage.

7. A vehicle suspension system comprising a first damper and a second damper, said first damper and said second damper being interrelated, said first damper comprising a first piston and a first cylinder body, a first cylinder bore being defined by said first cylinder body, said first piston arranged to reciprocate within said first cylinder bore, said first piston having a first effective area $a_1$, said first damper extending between a first wheel and a vehicle body, said second damper comprising a second piston and a second cylinder body, a second cylinder bore being defined by said second cylinder body, said second piston being arranged to reciprocate within said second cylinder bore, said second piston having a second effective area $a_2$, said second damper extending between a second wheel and said vehicle body, a first chamber being defined within said first cylinder body at least in part by said first piston, a second chamber being defined within said second cylinder body at least in part by said second piston, a first pressure regulating cylinder being in fluid communication with said first chamber and a second pressure regulating cylinder being in fluid communication with said second chamber, said first pressure regulating cylinder comprising a first variable volume chamber and said second pressure regulating cylinder comprising a second variable volume chamber, said first variable volume chamber and said second variable volume chamber being defined at least in pan by a single moveable member, said single moveable member having a first subarea $A_1$ that corresponds to said first variable volume chamber and a second subarea $A_2$ that corresponds to said second variable volume chamber, a bypass passage extending between said first variable volume chamber and said second variable volume chamber and a first throttle valve and a second throttle valve being positioned within said bypass passage, said suspension system being configured such that $$\left(\frac{S_1}{\lambda_1}\right) \times \left(\frac{a_1}{A_1}\right) \times \Delta\phi = -\left(\frac{S_2}{\lambda_2}\right) \times \left(\frac{a_2}{A_2}\right) \times \Delta\phi',$$

wherein $S_1$ and $S_2$ are a piston travel of said first piston and said second piston respectively, $\lambda_1$ and $\lambda_2$ are the travel of said first wheel and said second wheel respectively and $\Delta\phi$ and $\Delta\phi'$ are a first differential pressure when a working fluid flows from said first variable volume chamber to said second variable volume chamber and a second differential pressure when said working fluid flows from said second variable volume chamber to said first variable volume chamber, and wherein at least one of the blowing conditions is satisfied when said first wheel and said second wheel are moving in opposite directions at approximately a single absolute value of speed: $a_1$ is not the same as $a_2$, $S_1/\lambda_1$ is not the same as $S_2/\lambda_2$, or a first damping characteristic associated with flow of said working fluid from said first variable volume chamber to said second variable volume chamber is not the same as a second damping characteristic associated with flow of said working fluid from said second variable volume chamber to said first variable volume chamber.

8. The suspension system of claim 7 further comprising a first piston rod extending from said first piston and a second piston rod extending from said second piston, said effective areas $a_1$ and $a_2$ of said first piston and said second piston comprising a cross-sectional area of said first piston rod and said second piston rod respectively.

9. The suspension system of claim 7, wherein a first passage extends through said first piston such that a third chamber is defined within said first cylinder body at least partially by said piston.

10. The suspension system of claim 9, wherein a second passage extends through said second piston such that a fourth chamber is defined within said second cylinder body at least partially by said piston.

11. The suspension system of claim 10, wherein a throttle valve is disposed along said second passage.

12. The suspension system of claim 9, wherein a throttle valve is disposed along said first passage.

13. An vehicle suspension system comprising a first damper and a second damper, said first damper and said second damper being interrelated, said first damper comprising a first piston and a body, a first cylinder bore being defined by said first cylinder body, said first piston arranged to reciprocate within said first cylinder bore, said first piston having a first effective area $a_1$, said first damper extending between a first wheel and a vehicle body, said second damper comprising a second piston and a second cylinder body, a second cylinder bore being defined by said second cylinder body, said second piston being arranged to reciprocate within said second cylinder bore, said second piston having a second effective area $a_2$, said second damper extending between a second wheel and said vehicle body, a first chamber being defined within said first cylinder body at least in part by said first piston, a second chamber being defined within said second cylinder body at least in part by said second piston, a first pressure regulating cylinder being in fluid communication with said first chamber and a second pressure regulating cylinder being in fluid communication with said second chamber, said first pressure regulating cylinder comprising a first variable volume chamber and said second pressure regulating cylinder comprising a second variable volume chamber, said first variable volume chamber and said second variable volume chamber being defined at least in part by a single moveable member, said single movable member having a first subarea $A_1$ that corresponds to said first variable volume chamber and a second subarea $A_2$ that corresponds to said second variable volume chamber, a bypass passage extending between said first variable volume chamber and said second variable volume chamber and a first throttle valve and a second throttle valve being positioned within said bypass passage, said suspension system being configured such that $$\left(\frac{S_1}{\lambda_1}\right) \times \left(\frac{a_1}{A_1}\right) \times \frac{\Delta\Phi}{W_1} = -\left(\frac{S_2}{\lambda_2}\right) \times \left(\frac{a_2}{A_2}\right) \times \frac{\Delta\Phi'}{W_2},$$

wherein S and $S_2$ are a piston travel of said first piston and said second piston respectively, $\lambda_1$ and $\lambda_2$ are the travel of said first wheel and said second wheel respectively, $\Delta\phi$ and $\Delta\phi'$ are a first differential pressure when a working fluid flows from said first variable volume chamber to said second variable volume chamber and a second differential pressure when said working fluid flows from said second variable volume chamber to said first variable volume chamber respectively and $W_1$ and $W_2$ are a first static ground contact load at a contact surface between said first wheel and a reference plane and a second static ground contact load at a contact surface between said second wheel and said reference plane, and wherein at least one of the following conditions is satisfied when said first wheel and said second wheel are moving in opposite directions at approximately a single absolute value of speed: $a_1$ is not the same as $a_2$, $W_1$ is not the same as $W_2$, $S_1/\lambda_1$ is not the same as $S_2/\lambda_2$, or a first damping characteristic associated with flow of said working fluid from said first variable voluble chamber to said second variable volume chamber is not the same as a second damping characteristic associated with flow of said working fluid from said second variable volume chamber to said first variable volume chamber.

14. The suspension system of claim 13 further comprising a first piston rod extending from said first piston and a second piston rod extending from said second piston, said effective areas $a_1$ and $a_2$ of said first piston and said second piston comprising a cross-sectional area of said first piston rod and said second piston rod respectively.

15. The suspension system of claim 14, wherein a first passage extends through said first piston switch that a third chamber is declined within said first cylinder body at least partially by said piston.

16. The suspension system of claim 15, wherein a second passage extends through said second piston such that a fourth chamber is defined within said second cylinder body at least partially by said piston.

17. The suspension system of claim 16, wherein a throttle valve is disposed along said second passage.

18. The suspension system of claim 15, wherein a throttle valve is disposed along said first passage.

19. A vehicle suspension system comprising a first damper and a second damper, said first damper and said second damper being interrelated, said first damper comprising a first piston and a first cylinder body, a first cylinder bore being defined by said first cylinder body, said first piston arranged to reciprocate within said first cylinder bore, said first damper extending between a first wheel and a vehicle body, said second damper comprising a second piston and a second cylinder body, a second cylinder bore being defined by said second cylinder body, said second piston being arranged to reciprocate within said second cylinder bore, said second damper extending between a second wheel and said vehicle body, a first chamber being defined within said first cylinder body at least in part by said first piston, a second chamber being defined within said second cylinder body at least in part by said second piston, a first pressure regulating cylinder being in fluid communication with said first chamber and a second pressure regulating cylinder being in fluid communication with said second chamber, said first pressure regulating cylinder comprising a first variable volume chamber and said second pressure regulating cylinder comprising a second variable volume chamber, said first variable volume chamber and said second variable volume chamber being defined at least in part by a single moveable member, a bypass passage extending between said first variable volume chamber and said second variable volume chamber and a first throttle valve and a second throttle valve being positioned within said bypass passage and means for substantially stopping flow through said bypass passage when said first wheel and said second wheel move relative to said vehicle body.

20. The suspension system of claim 19, wherein said means for substantially stopping flow operates when said first wheel and said second wheel move in opposing directions at approximately a same absolute value speed.

* * * * *